US011960198B2

(12) United States Patent
Harmon et al.

(10) Patent No.: US 11,960,198 B2
(45) Date of Patent: Apr. 16, 2024

(54) FRONT TRUNK INCLUDING SCREEN FOR DISPLAYING IMAGES OR VIDEO

(71) Applicant: Ford Global Technologies, LLC, Dearborn, MI (US)

(72) Inventors: Michael John Harmon, Northville, MI (US); Hussain Z Tajmahal, Detroit, MI (US); Benjamin Howard, Grosse Pointe Park, MI (US); Kathryn N. Cezar, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 17/892,330

(22) Filed: Aug. 22, 2022

(65) Prior Publication Data

US 2023/0393455 A1 Dec. 7, 2023

Related U.S. Application Data

(60) Provisional application No. 63/347,704, filed on Jun. 1, 2022.

(51) Int. Cl.
*G03B 21/58* (2014.01)
*B60R 5/02* (2006.01)
*B60R 11/02* (2006.01)

(52) U.S. Cl.
CPC ............... *G03B 21/58* (2013.01); *B60R 5/02* (2013.01); *B60R 11/0235* (2013.01)

(58) Field of Classification Search
CPC .................... G03B 21/30; G03B 21/58–585
See application file for complete search history.

(56) References Cited

U.S. PATENT DOCUMENTS

| 8,733,939 B2* | 5/2014 | Othmer | B60Q 1/543 |
| | | | 353/69 |
| 10,717,471 B2* | 7/2020 | Glickman | B60Q 3/30 |
| 10,725,503 B2* | 7/2020 | Choi | G06F 3/04847 |
| 2023/0373301 A1* | 11/2023 | Elder | G03B 21/10 |

FOREIGN PATENT DOCUMENTS

| CN | 1775593 A * | 5/2006 | |
| CN | 112644406 A * | 4/2021 | .............. B60J 1/02 |
| DE | 102004035673 A1 * | 3/2006 | .............. B60R 5/04 |

(Continued)

OTHER PUBLICATIONS

Patrascu, D. (Nov. 15, 2020). Ford F-350 tailgate party truck with 65-inch TV in the bed sells for $275K. autoevolution. Retrieved Aug. 17, 2022, from https://www.autoevolution.com/news/ford-f-350-tailgate-party-truck-with-65-inch-tv-in-the-bed-sells-for-275k-151537.html#agal_4.

(Continued)

*Primary Examiner* — Leon W Rhodes, Jr.
(74) *Attorney, Agent, or Firm* — Vichit Chea; Carlson, Gaskey & Olds, P.C.

(57) ABSTRACT

This disclosure relates to a front trunk including a screen for displaying still images or video. Among other benefits, which will be appreciated from the below description, the disclosed features increase the usability of the front trunk, and, in turn, the vehicle overall. In particular, many of the features discussed below are intended to make the front trunk more usable at worksites, tailgating events, etc.

12 Claims, 4 Drawing Sheets

(56) References Cited

FOREIGN PATENT DOCUMENTS

| DE | 102006036061 A1 | * | 2/2008 | ............... | B60Q 1/50 |
| KR | 20170016622 A | * | 2/2017 | ............... | B60Q 7/00 |

OTHER PUBLICATIONS

You want to mount a TV in your trunk to display videos for car shows? no problem. Facebook. (n.d.). Retrieved Aug. 17, 2022, from https://www.facebook.com/vanworkscaraudio/photos/you-want-to-mount-a-tv-in-your-trunk-to-display-videos-for-car-shows-no-problem-/1226136674126154/.

F 150 tops AAA list of top vehicle picks for tailgating. Ford Trucks. (n.d.). Retrieved Aug. 17, 2022, from https://www.fordtrucks.com.tr/en/.

* cited by examiner

FRONT TRUNK INCLUDING SCREEN FOR DISPLAYING IMAGES OR VIDEO

RELATED APPLICATION(S)

This application claims the benefit of U.S. Provisional Application No. 63/347,704, filed Jun. 1, 2022, the entirety of which is herein incorporated by reference.

TECHNICAL FIELD

This disclosure relates to a front trunk including a screen for displaying still images or video.

BACKGROUND

Electrified vehicles are being developed to either reduce or completely eliminate the reliance on internal combustion engines. With the onset of electrified vehicles, many existing components in the vehicle engine compartment may become unnecessary. The space made available by the removal of these components makes room for a front trunk, which is a storage compartment located near the front of the vehicle, and which is commonly referred to using the portmanteau "frunk."

SUMMARY

In some aspects, the techniques described herein relate to a motor vehicle, including: a front trunk including a screen configured to display still images or video.

In some aspects, the techniques described herein relate to a motor vehicle, wherein the screen is a screen of an electronic visual display.

In some aspects, the techniques described herein relate to a motor vehicle, further including a housing, wherein the electronic visual display is moveable relative to the housing between a retracted position in which the electronic visual display is inside the housing, and a deployed position in which the electronic visual display is at least partially outside the housing such that the screen is visible.

In some aspects, the techniques described herein relate to a motor vehicle, wherein the housing includes a slot in a top of the housing, wherein the slot leads to an interior of the housing, and wherein, when the electronic visual display is in the deployed position, the electronic visual display projects at least partially out of the slot.

In some aspects, the techniques described herein relate to a motor vehicle, further including a powered assembly configured selectively cause the electronic visual display to move to the retracted and deployed positions.

In some aspects, the techniques described herein relate to a motor vehicle, further including a closure assembly moveable between a closed position and an open position to cover and uncover the front trunk.

In some aspects, the techniques described herein relate to a motor vehicle, wherein, when the electronic visual display is in the retracted position, the housing is configured so as to not impede movement of the closure assembly to the closed position.

In some aspects, the techniques described herein relate to a motor vehicle, wherein the powered assembly is configured to move the electronic visual display to the deployed position as the closure assembly moves to the open position.

In some aspects, the techniques described herein relate to a motor vehicle, wherein the housing is a housing of a cartridge, and wherein the cartridge is removable from the front trunk.

In some aspects, the techniques described herein relate to a motor vehicle, wherein the screen is a projection screen.

In some aspects, the techniques described herein relate to a motor vehicle, further including: a closure assembly configured to move between a closed position and an open position to selectively cover and uncover the front trunk, wherein the projection screen is configured to roll in and out of a screen case, and wherein a support beam of the projection screen is attachable to the closure assembly.

In some aspects, the techniques described herein relate to a motor vehicle, wherein the screen case is removable from the front trunk.

In some aspects, the techniques described herein relate to a motor vehicle, wherein the screen case is mounted relative to the front trunk so as to not impede movement of the closure assembly to the closed position.

In some aspects, the techniques described herein relate to a motor vehicle, further including a projector mounted to a grille section of the closure assembly and configured to project still images or video onto the projection screen.

In some aspects, the techniques described herein relate to a motor vehicle, further including: a closure assembly configured to move between a closed position and an open position to selectively cover and uncover the front trunk, wherein a liner of a hood section of the closure assembly provides the projection screen.

In some aspects, the techniques described herein relate to a method, including: displaying still images or video on a screen in a front trunk of a motor vehicle.

In some aspects, the techniques described herein relate to a method, wherein the screen is a screen of an electronic visual display, and the method further includes: moving the electronic visual display relative to a housing from a retracted position in which the electronic visual display is inside the housing to a deployed position in which the electronic visual display is at least partially outside the housing such that the screen is visible.

In some aspects, the techniques described herein relate to a method, wherein the step of moving the electronic visual display to the deployed position is performed as a closure assembly of the front trunk is moving to an open position.

In some aspects, the techniques described herein relate to a method, wherein the screen is a projection screen, and the method further includes: rolling the screen out of a screen case and attaching the screen to a closure assembly of the front trunk; and projecting still images or video onto the screen using a projector mounted to a grille section of the closure assembly.

In some aspects, the techniques described herein relate to a method, wherein the screen is a projection screen provided by a liner of a hood section of a closure assembly of the front trunk.

DETAILED DESCRIPTION

This disclosure relates to a front trunk including a screen for displaying still images or video. Among other benefits, which will be appreciated from the below description, the disclosed features increase the usability of the front trunk, and, in turn, the vehicle overall. In particular, many of the features discussed below are intended to make the front trunk more usable at worksites, tailgating events, etc.

Figure 1:
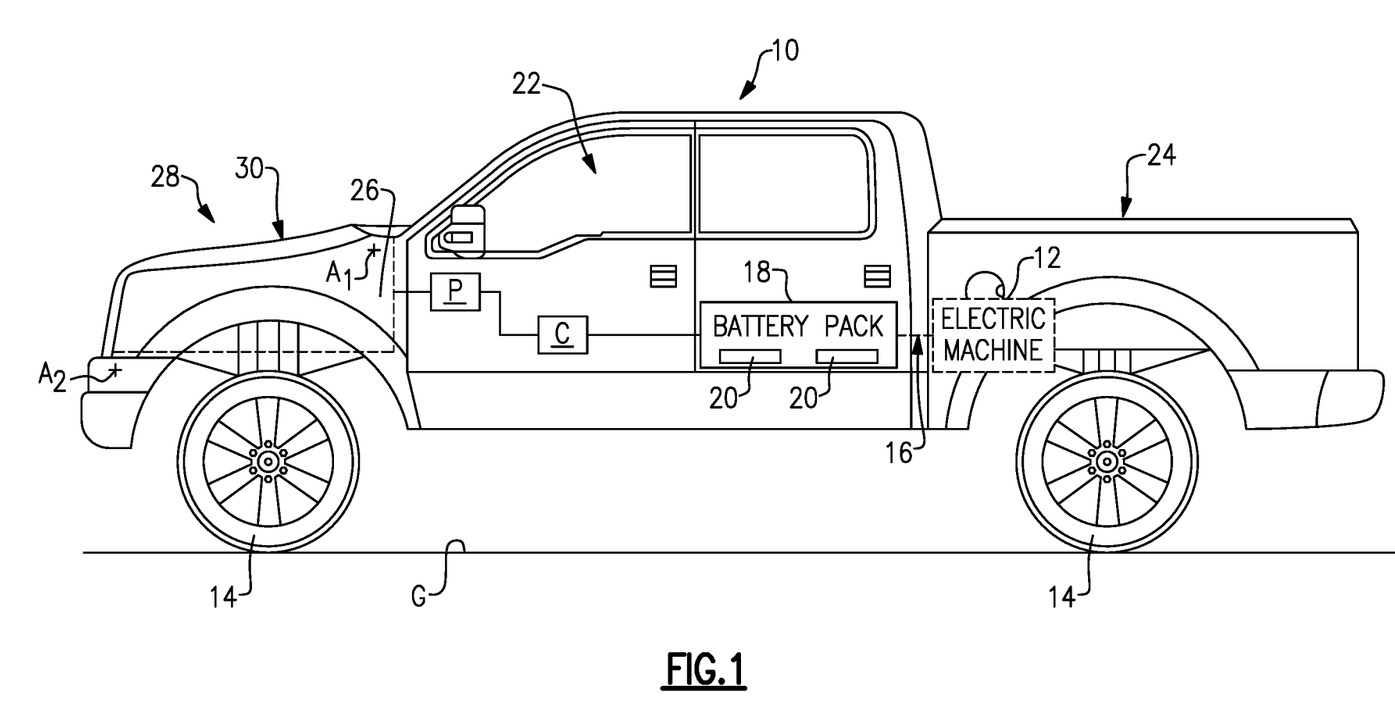
FIG. 1 schematically illustrates an electrified vehicle.

FIG. 1 schematically illustrates a motor vehicle, which here is an electrified vehicle 10 ("vehicle 10"). The vehicle 10 may include any type of electrified powertrain. In an embodiment, the vehicle 10 is a battery electric vehicle (BEV). However, the concepts described herein are not limited to BEVs and could extend to other electrified vehicles, including, but not limited to, plug-in hybrid electric vehicles (PHEVs), fuel cell vehicles, etc. Therefore, although not specifically shown in this embodiment, the vehicle 10 could be equipped with an internal combustion engine that can be employed either alone or in combination with other energy sources to propel the vehicle 10. In particular, certain aspects of this disclosure could apply to vehicles other than electrified vehicles that include front trunks, such as mid-engined or rear-engined vehicles.

In the illustrated embodiment, the vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14, such as through a transmission gearbox (not shown).

A voltage bus 16 electrically connects the electric machine 12 to a battery pack 18. The battery pack 18 is an exemplary electrified vehicle battery. The battery pack 18 may be a high voltage traction battery pack that includes one or more battery arrays 20 (i.e., groupings of rechargeable battery cells) capable of outputting electrical power to operate the electric machine 12 and/or other electrical loads of the vehicle 10. Other types of energy storage devices and/or output devices can also be used to electrically power the vehicle 10.

In the illustrated embodiment, the vehicle 10 is a pickup truck. However, the vehicle 10 could also be a car, a van, a sport utility vehicle, or any other type of vehicle.

As shown in FIG. 1, the vehicle 10 includes a passenger cabin 22, a truck bed 24 located to the rear of the passenger cabin 22, and a front trunk 26 located to the front of the passenger cabin 22. The truck bed 24 may establish a first cargo space of the vehicle 10, and the front trunk 26 may establish a second cargo space of the vehicle 10. The front trunk 26 may be referred to using the portmanteau "frunk" or more generally as a front cargo space.

The front trunk 26 may provide an additional cargo space not traditionally available in most conventional internal combustion powered vehicles. This disclosure includes various features that increase the usefulness and usability of the front trunk 26.

The front trunk 26 is selectively covered by a closure assembly 28. In this example, the closure assembly 28 is provided by a panel 30 that provides the hood and grille of the vehicle 10. The panel 30 is rotatable about axis $A_1$ adjacent a rear of the panel 30 between a closed position (FIG. 1) and an open position (FIG. 2) to selectively cover and uncover the front trunk 26.

In an alternate embodiment, the closure assembly 28 is provided by a two separate panels, one of which is a hood panel, which is rotatable about the axis $A_1$ to cover and uncover the front trunk 26 from the top, and the other of which is a grille panel, which is rotatable about axis $A_2$ adjacent a bottom edge of the grille panel to cover and uncover the front trunk 26 from the front. Specifically, in that embodiment, the grille panel would rotate to an open position generally in an opposite direction as the hood panel, and in particular rotates generally forward and downward about the axis $A_2$ to the open position.

Figure 2:
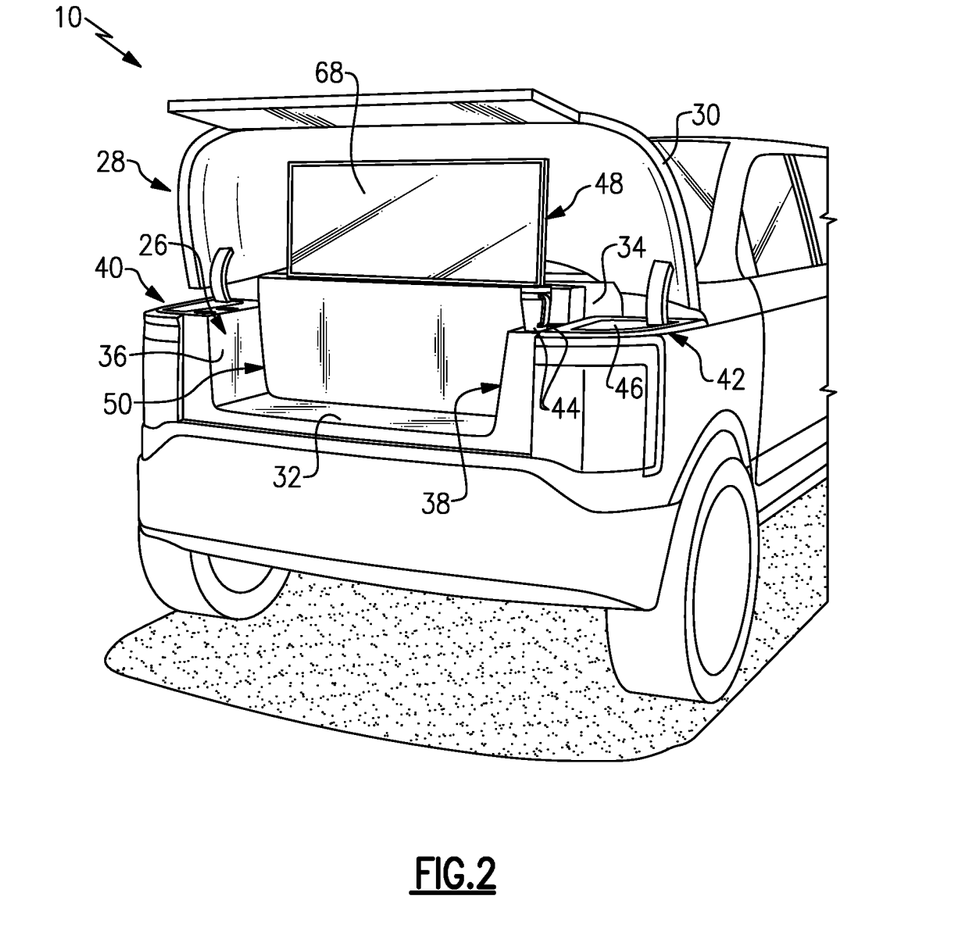
FIG. 2 is a perspective view of a front trunk including a first embodiment of a screen.

FIG. 2 illustrates the interior of the front trunk 26. The front trunk 26 includes a floor 32, a rear wall 34, and opposed lateral side walls 36, 38, which provide boundaries of a front cargo space of the vehicle 10. Various items can rest on the floor 32, and various other items can be attached to the rear wall 34 and the side walls 36, 38, in this example.

Laterally outward of the side walls 36, 38, side ledges 40, 42 are accessible and usable when the panel 30 is open. The side ledges 40, 42 extend laterally from an upper portion of a respective one of the side walls 36, 38 to an exterior side of the vehicle 10, and otherwise generally exhibit a similar contour to the panel 30 such that when the panel 30 is closed, the panel 30 overlaps and covers the side ledges 40, 42. In an example, the panel 30 directly abuts the side ledges 40, 42 when the panel 30 is closed. The side ledges 40, 42 are configured as useable spaces when the panel 30 is open. With reference to side ledge 42, the side ledge 42 includes two cup holders 44 and a work surface 46. The side ledge 40 is configured similarly, but reflected about the centerline of the vehicle 10. The side ledges 40, 42 are exemplary and could be configured differently. Further, the side ledges 40, 42 are not required in all examples.

The front trunk 26 may include various power outlets including 120 Volt power outlets, 240 Volt power outlets, USB-C outlets, etc. The front trunk 26 could include a desired number of power outlets in various locations.

The various surfaces of the front trunk 26 may be made of a polymeric material. However, other materials, including metallic materials, are also contemplated within the scope of this disclosure.

This disclosure relates to a screen configured to display still images or video relative to the front trunk 26. In particular, this disclosure includes an embodiment in which the screen is a screen of an electronic visual display, such as a television, and another embodiment in which the screen is a projection screen. Both types of screens are able to be mounted relative to the front trunk 26 to display still images or video for the enjoyment of users adjacent the vehicle 10.

FIG. 2 illustrates an embodiment in which the front trunk 26 includes an electronic visual display 48. In this example, the electronic visual display 48 is a television or computer monitor and can display images and video for the enjoyment of users adjacent the front trunk 26, such as during tailgating or similar activities. In this example, the electronic visual display 48 is contained within a housing 50 of a cartridge 52.

Figure 3:
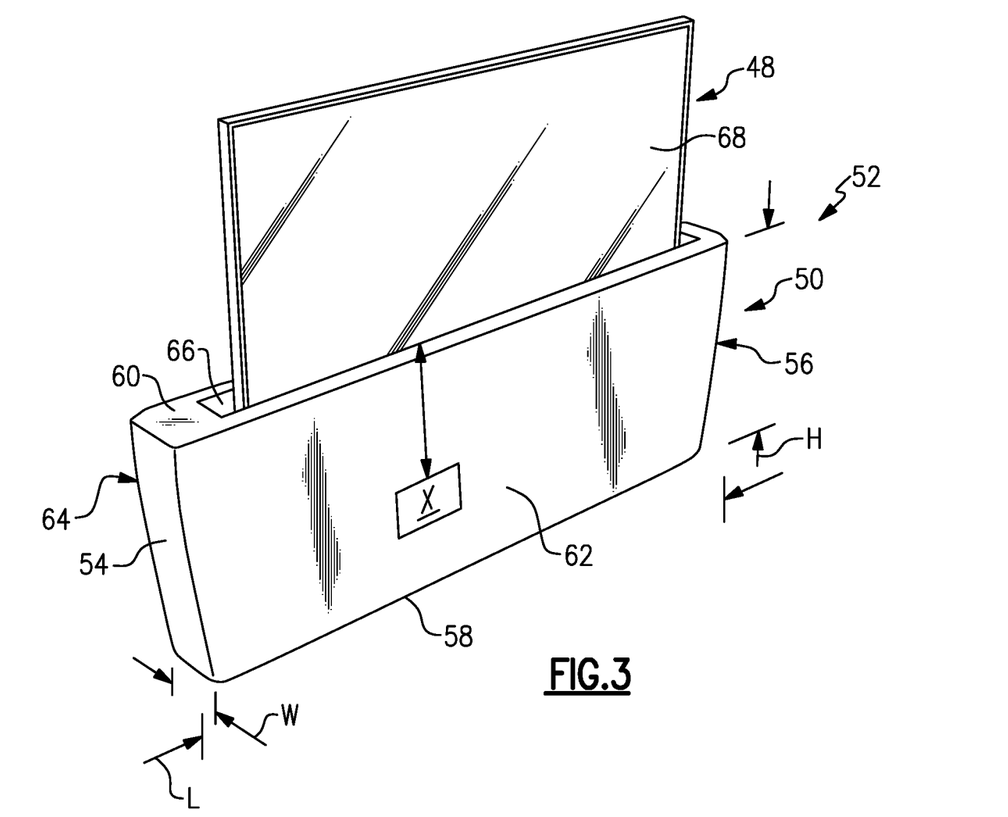
FIG. 3 illustrates the screen of FIG. 2 in a deployed position.

With reference to FIG. 3, the housing 50 exhibits a length L between side walls 54, 56, a height H between a base 58 and a top 60, and a width W between a front wall 62 and a rear wall 64. The length L in this example substantially equals, and is slightly less than, the distance between the side walls 36, 38. The height H substantially equals, and is slightly less than, a height of the cargo space of the front trunk 26, and in an example substantially equals the height of the rear wall 34.

In this example, a slot 66 is formed in the top 60. The slot 66 leads to an interior of the housing 50, which includes a cavity sized and shaped to fit the entire electronic visual display 48. In this regard, the electronic visual display 48 is configured to be raised and lowered to deployed (FIGS. 2 and 3) and retracted (FIG. 4) positions by a lift assembly X incorporated into the cartridge 52, in this example. The lift assembly X is shown schematically and includes one or more powered actuators, gears, and/or linkages configured to move the electronic visual display 48 between the retracted and deployed positions automatically and without requiring a user to apply force to move the electronic visual display 48. While a lift assembly X is shown, the electronic visual display 48 could alternatively or additionally be manually moveable.

In the deployed position, the electronic visual display 48 is substantially perpendicular to a ground surface G, and in particular a screen 68 of the electronic visual display 48 is substantially perpendicular to the ground surface G, which increases the ease of viewing the electronic visual display 48. The ground surface G is the surface immediately under the wheels 14 of the vehicle 10, and may be concrete, pavement, grass, dirt, etc. The ground surface G may be uneven. The term "substantially" is used herein to refer to angles that one would consider substantially close to perpendicular given the fact that the vehicle 10 may be on an uneven ground surface G. As another reference point, the screen 68 of the electronic visual display 48 is perpendicular to a plane containing the floor 32, within acceptable tolerances, such as ±3°. Further, in the deployed position, the screen 68 is at least partially outside of the housing 50 such that the screen 68 is visible from a front of the front trunk 26. In a particular example, the screen 68 is entirely outside the housing 50 when in the deployed position.

The cartridge 52 is arranged in the front trunk 26 such that the electronic visual display 48 can move to the deployed position without interfering with the closure assembly 28. In this example, the closure assembly 28 is configured such that the cartridge 52 is able to be positioned adjacent the rear wall 34. In other examples, the cartridge 52 can be in another location in the front trunk 26 depending on the angle and/or orientation of the closure assembly 28, or other factors.

Figure 4:
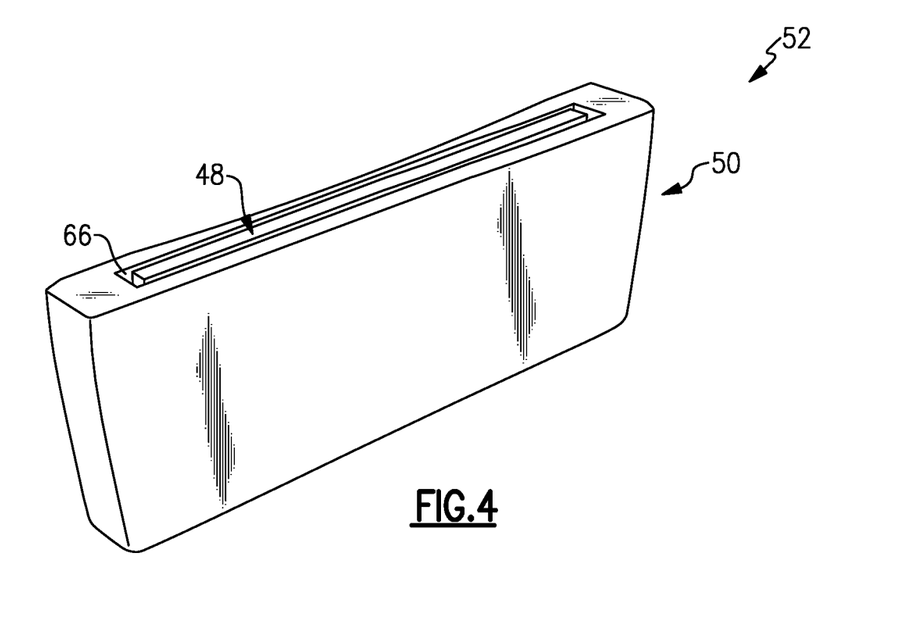
FIG. 4 illustrates the screen of FIG. 2 in a retracted position.

In an example, in the retracted position, an entirety of the screen 68 is stored within the housing 50. In this way, the housing 50 provides a barrier between the screen 68 and any items within the front trunk 26. Further, in the retracted position, the electronic visual display 48 and the housing 50 do not impede closure or opening of the closure assembly 28.

In an example, in with the electronic visual display 48 in the retracted position, the entire cartridge 52 can be removed from the front trunk 26. In this manner, the electronic visual display 48 can be stored in another location to provide additional room in the front trunk 26. The front trunk 26 and/or cartridge 52 may include recesses, slots, tabs, fasteners, or other mechanical features configured to selectively hold the cartridge 52 in place relative to the front trunk 26. The cartridge 52 may also include one or more electrical connectors configured to connect the electronic visual display 48 and lift assembly X to power sources and the controller C (FIG. 1) of the vehicle 10. To remove the cartridge 52, any mechanical and electrical connections are first detached. In other examples, the cartridge 52 is not removable from the front trunk 26, and is instead integrally formed with one or more of the walls of the front trunk 26, for example.

An exemplary manner in which the electronic visual display 48 is presented will now be described. In this example, the electronic visual display 48 is presented automatically and in coordination with movement of the closure assembly 28.

The closure assembly 28 is moveable between the closed and open positions by a powered assembly P (FIG. 1) in this example. The powered assembly P can include one or more powered actuators, gears, and/or linkages configured to move the closure assembly 28 between the closed and open positions automatically and without requiring a user to apply force to move the closure assembly 28. The lift assembly X, which itself is a powered assembly, can be considered a subassembly of the powered assembly P.

Further, the vehicle 10 includes a controller C (FIG. 1) that can be part of an overall vehicle control module, such as a vehicle system controller (VSC), or could alternatively be a stand-alone controller separate from the VSC. The controller C may be programmed with executable instructions for interfacing with and operating the various components of the vehicle 10. The controller additionally includes a processing unit and non-transitory memory for executing the various control strategies and modes of the vehicle 10. The controller C can issue commands to the powered assembly P and the lift assembly X, which are responsive of those commands to initiate corresponding movements of the closure assembly 28 and electronic visual display 48, as examples.

In an example, when the closure assembly 28 is closed (FIG. 1) and the electronic visual display 48 is in the retracted position, in response to a command from the user, for example, the controller C is configured to command the powered assembly P to move the closure assembly 28 to the open position while simultaneously issuing a command causing the lift assembly X to move the electronic visual display 48 to the deployed position. In this way, as the closure assembly 28 opens, the electronic visual display 48 gradually moves vertically upward out of the housing 50 to the deployed position. The controller C is also configured to issue commands causing the closure assembly 28 to move the closed position simultaneous with movement of the electronic visual display 48 to the retracted position. While simultaneous movements are described, the controller C could initiate other movements, such as stepped or staggered movements, in which the closure assembly 28 and electronic visual display 48 move during different time periods.

Figure 5:
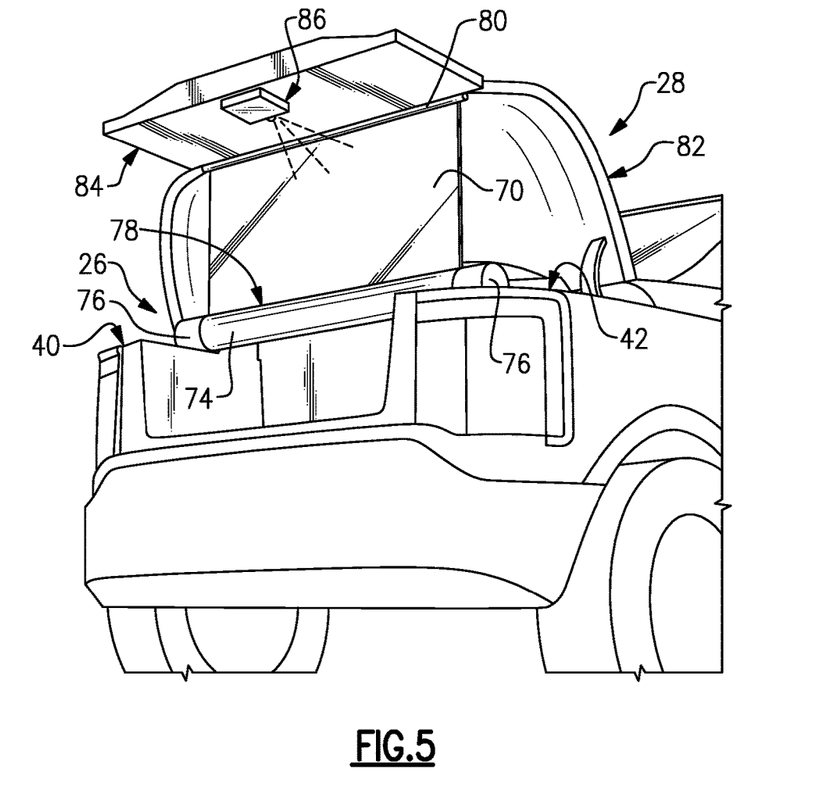
FIG. 5 is a perspective view of a front trunk including a second embodiment of a screen.

FIG. 5 illustrates another embodiment of this disclosure in which the screen is a projection screen 70. The projection screen 70 is configured to roll in and out of a screen case 74. The screen case 74 includes end caps 76 and a slot 78 permitting the projection screen 70 to roll in and out of the screen case 74 between a retracted position and a deployed position, the latter of which is shown in FIG. 5. The end caps 76, in this example, are attached to the side ledges 40, 42. The projection screen 70 is arranged about a rod within the screen case 74. The rod is spring-biased to pull the projection screen 70 toward the retracted position in which an entirety of the projection screen 70 is within the screen case 74. The springs biasing the rod also keep tension on the projection screen 70 when the projection screen 70 is in the deployed position.

The projection screen 70 is attached to a support beam 80. The support beam may include a handle, latch, or hook, as examples. The support beam 80 is attachable to the closure assembly 28, and in this example, is attachable to the closure assembly 28 adjacent an intersection of a portion of the panel 30 that provides a hood section, labeled 82, and a portion of the panel 30 that provides a grille section, labeled 84. The grille section 84 projects substantially parallel to the ground surface G when the closure assembly 28 is in the open position. In this example, a projector 86 is attached to the underside 88 of the grille section 84. The underside 88 faces an interior of the front trunk 26 when the closure assembly 28 is closed. The projector 86 is configured to display still images and/or video on the projection screen 70.

The support beam 80 can remain attached to the closure assembly 28 as the closure assembly 28 opens and closes. As such, the projection screen 70 will naturally move between the deployed and retracted positions as the closure assembly 28 opens and closes, respectively. In this manner, the projection screen 70, and in particular the screen case 74 and end caps 76, are mounted relative to the front trunk 26 so as to not impede movements of the closure assembly 28 to the open and closed positions. Alternatively, a user may selectively attach and detach the projection screen 70, namely the support beam 80, to the closure assembly 28, as desired.

The screen case 74, and in turn the projection screen 70, end caps 76, and support beam 80, may be selectively attachable and removable from the front trunk 26. In this example, the side ledges 40, 42 and end caps 76 may include recesses, slots, tabs, fasteners, or other mechanical features configured to selectively hold the screen case 74 in place relative to the front trunk 26. Alternatively, the screen case 74 may be integrally formed with a portion of the front trunk 26.

The projector 86 can be selectively attachable to the closure assembly 28, as shown in FIG. 5. Alternatively, the projector 86 can be integrally formed into the closure assembly 28. Further, the projector 86 need not be attached to the closure assembly 28, and instead a separate, stand-alone projector could be used relative to the projection screen 70, such as by arranging a projector on a stand adjacent a front of the vehicle 10.

Figure 6:
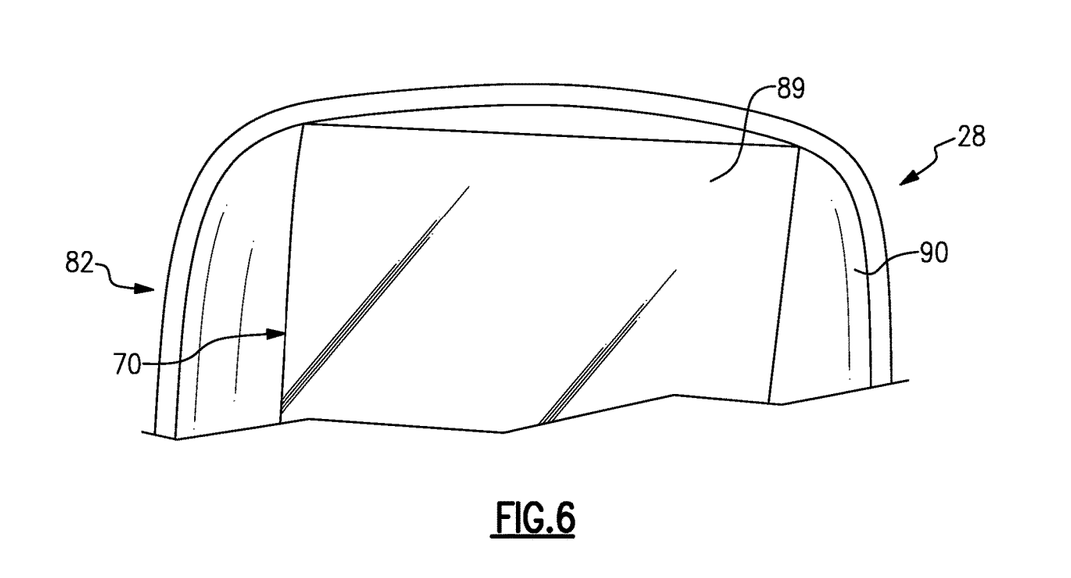
FIG. 6 is a perspective view of a portion of a closure assembly for a front trunk including a third embodiment of a screen.

FIG. 6 illustrates an alternate embodiment of the projection screen 70. In this embodiment, the projection screen 70 is provided by a liner 89 of the hood section 82 of the closure assembly 28. In particular, at least a portion of the underside 90 of the hood section 82 is made of a material used to make projection screens, whereas the remainder of the underside 90 is made of a different material, such as insulative or decorative material. The underside 90 faces an interior of the front trunk 26 when the closure assembly 28 is closed. The embodiment of FIG. 6 could be used with a projector 86, as shown in FIG. 5, or with a stand-alone projector. Further, the embodiment of FIG. 6 could be incorporated into a closure assembly 28 having a single panel or separately moveable grille and hood panels.

The electronic visual display 48 and projector 86 are connectable to various devices and are able to play media, including images and video, as commanded by those devices. For example, the electronic visual display 48 and projector 86 are connectable, by a wired or wireless connection, to an infotainment system of the vehicle 10 or another source, such as a computing device or a mobile device of user.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used with reference to the normal operational orientation of the vehicle and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising: a front trunk including a screen configured to display still images or video;
   a housing, wherein the screen is moveable relative to the housing between a retracted position in which the screen is inside the housing, and a deployed position in which the screen is at least partially outside the housing such that the screen is visible;
   a powered assembly configured to selectively cause the screen to move to the retracted and deployed positions; and
   a closure assembly moveable between a closed position and an open position to cover and uncover the front trunk;
   wherein the powered assembly is configured to move the screen to the deployed position as the closure assembly moves to the open position.

2. The motor vehicle as recited in claim 1, wherein the screen is a screen of an electronic visual display.

3. The motor vehicle as recited in claim 2, wherein the housing includes a slot in a top of the housing, wherein the slot leads to an interior of the housing, and wherein when the electronic visual display is in the deployed position, the electronic visual display projects at least partially out of the slot.

4. The motor vehicle as recited in claim 2, wherein, when the electronic visual display is in the retracted position, the housing is configured so as to not impede movement of the closure assembly to the closed position.

5. The motor vehicle as recited in claim 1, wherein the housing is a housing of a cartridge, and wherein the cartridge is removable from the front trunk.

6. The motor vehicle as recited in claim 1, wherein the screen is a projection screen.

7. A motor vehicle, comprising: a front trunk including a projection screen configured to display still images or video;
   a closure assembly configured to move between a closed position and an open position to selectively cover and uncover the front trunk, wherein the projection screen is configured to roll in and out of a screen case, and wherein a support beam of the projection screen is attachable to the closure assembly; and
   a projector mounted to a grille section of the closure assembly and configured to project still images or video onto the projection screen.

8. The motor vehicle as recited in claim 7, wherein the screen case is removable from the front trunk.

9. The motor vehicle as recited in claim 7, wherein the screen case is mounted relative to the front trunk so as to not impede movement of the closure assembly to the closed position.

10. A method, comprising:
moving a screen in a front trunk of a motor vehicle relative to a housing from a retracted position in which the screen is inside the housing to a deployed position in which the screen is at least partially outside the housing such that the screen is visible, and
displaying still images or video on the screen, wherein
the step of moving the screen to the deployed position is performed as a closure assembly of the front trunk is moving to an open position.

11. The method as recited in claim 10, wherein the screen is a screen of an electronic visual display.

12. A method, comprising:
displaying still images or video on a projection screen in a front trunk of a motor vehicle;
rolling the screen out of a screen case and attaching the screen to a closure assembly of the front trunk; and
projecting still images or video onto the screen using a projector mounted to a grille section of the closure assembly.

* * * * *